C. G. LIBBERS.
LOCK FOR DIFFERENTIAL GEARING.
APPLICATION FILED JUNE 3, 1913.
1,106,464.
Patented Aug. 11, 1914.
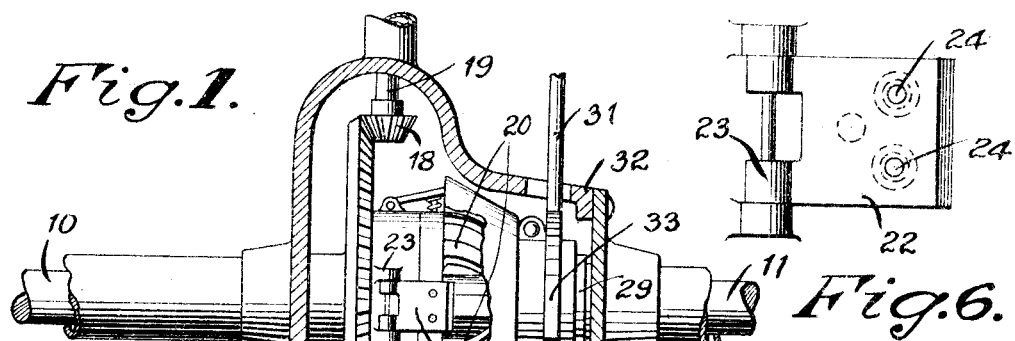
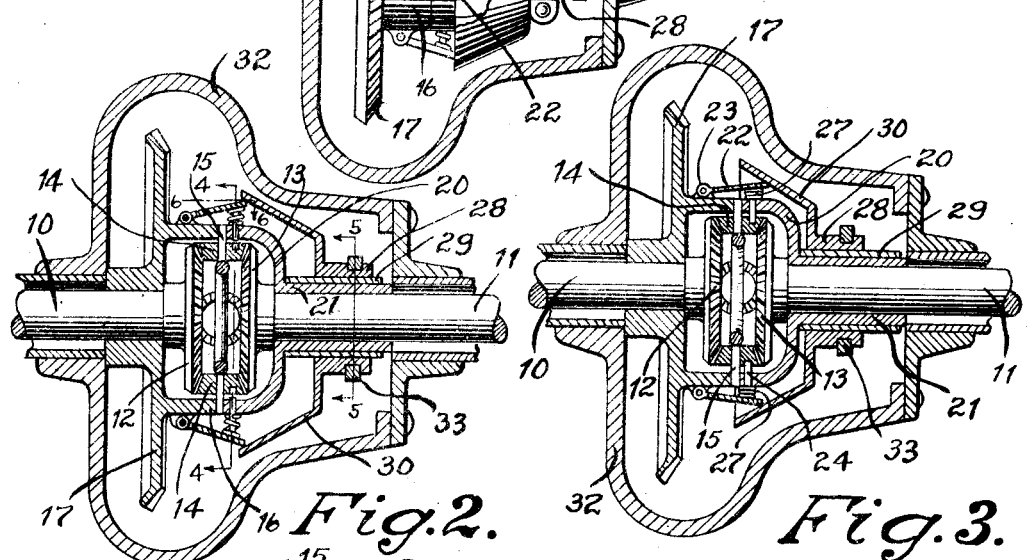
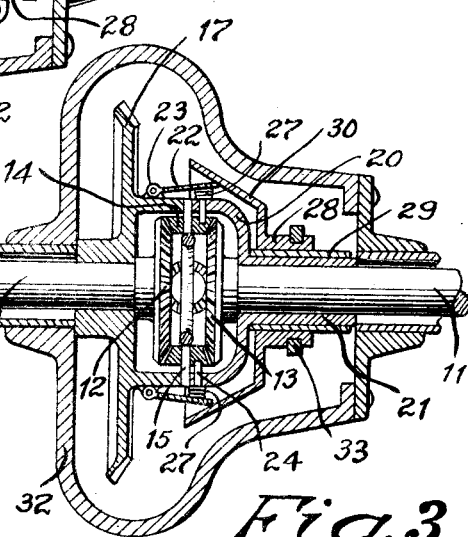
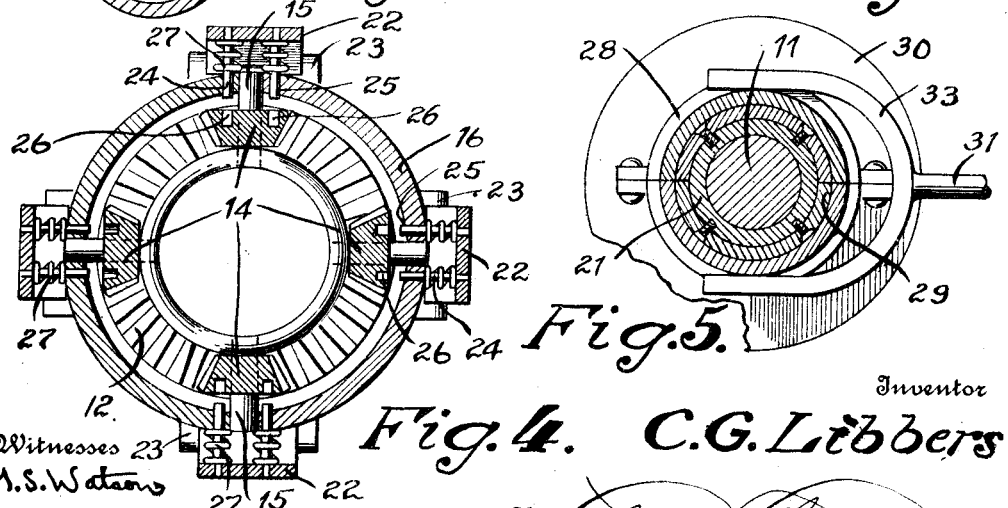

UNITED STATES PATENT OFFICE.

CLARENCE G. LIBBERS, OF FREMONT, MICHIGAN.

LOCK FOR DIFFERENTIAL GEARING.

1,106,464.  Specification of Letters Patent.  Patented Aug. 11, 1914.

Application filed June 3, 1913. Serial No. 771,473.

*To all whom it may concern:*

Be it known that I, CLARENCE G. LIBBERS, a citizen of the United States, residing at Fremont, in the county of Newaygo, State of Michigan, have invented certain new and useful Improvements in Locks for Differential Gearing; and I do hereby declare the following to be a full, clear, and exact description of the invention, such as will enable others skilled in the art to which it appertains to make and use the same.

This invention relates to differential gearing and has for an object to provide an improved locking device for neutralizing the differential action of the gearing whenever it is desired to drive the axle sections in unison to prevent one axle section from spinning around loosely while the other meets an obstruction and is retarded in its turning.

A further object is to provide an extremely simple and effective means for locking the bevel pinions of the differential gearing against turning whereby both sections of the axle may be rotated in unison.

A still further object is to provide a locking device which will be formed of a few simple parts that are simple in construction, strong and durable, and will not easily get out of order.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention:—Figure 1 is a plan view showing a differential gearing equipped with my improvements, with the casing broken away to expose the interior. Fig. 2 is a longitudinal sectional view through the differential gearing with the parts of the lock in released position. Fig. 3 is a longitudinal sectional view through the differential gearing with the parts of the lock in operative position. Fig. 4 is a cross sectional view taken on the line 4—4 Fig. 2. Fig. 5 is a cross sectional view on the line 5—5 Fig. 2. Fig. 6 is a fragmentary sectional view taken on the line 6—6 Fig. 2 showing one of the hinged plates in plan.

Referring now to the drawing in which like characters of reference designate similar parts, 10 and 11 designate axle sections of the rear or driving axle of an automobile or like vehicle. To the inner ends of these axle sections are secured bevel gear wheels 12 and 13 which mesh with a plurality of pinions 14 that are journaled on studs 15 carried by the hub 16 of a drive gear wheel 17 which is in mesh with a pinion 18 secured on the driving shaft 19. Integral with the hub 16 are radial arms 20 which merge into a hub 21 that surrounds the axle section 11, the drive gear 17 having a similar hub which surrounds the axle section 10.

The parts so far described, are practically the same as found in differential gearing now used, it being understood that when the shaft 19 is rotated, a rotary motion is transmitted by the pinion 18 to the drive gear 17 which latter rotates the axle sections and consequently turns the wheels held on said axle sections. Ordinarily, when one of the wheels strikes an obstruction, or is otherwise retarded from turning, the other wheel spins rapidly for the time being due to the action of the pinions 14, as will be understood, rotating freely on their studs. The aim of the present invention is to lock these pinions against such rotation, thereby neutralizing the action of the differential gear by locking both axle sections for rotation in unison and thereby positively obviating the spinning of the wheel and causing both ground wheels to coact in unison, in advancing the machine out of a rut or the like. To attain this end the following mechanism is employed: Upon the exterior of the hub 16 and above each pinion 14 a plate 22 is hinged as shown at 23, this plate carrying at the free end a pair of pins 24 which project loosely into openings 25 in the hub 16 and are designed, upon depression of the plate to enter corresponding openings 26 formed in the related pinion on opposite sides of its stud. Helical springs 27 are confined on the pins under compression between the plate and the hub and normally hold the plate raised whereby the pins are held withdrawn from the pinion and the pinion allowed to rotate in the ordinary manner. Upon depression of the plate, the pins will enter the openings in the pinion as above described, and positively lock the pinion against rotation, whereby both axle sections are locked together for rotation in unison.

For operating the plates 22 I provide a grooved sleeve 28 which is mounted to slide on a wear sleeve 29 that is clamped to the hub 21, both of these sleeves being preferably made in halves, as best shown in Fig. 5. A cone 30 is formed integral with the grooved sleeve and rides upon the free ends of the plates 22 upon shifting of the sleeve longitudinally with respect to the axle section 11. Upon the cone being moved toward the plates, the latter will be depressed with resultant application of the locking pins to the pinions. Upon the cone being moved away from the plates, the springs which control the latter, immediately move the latter outwardly with resultant disengagement of the pins from the pinions.

For shifting the cone above described, a shift lever 31 is passed through an opening in the differential gear casing 32 and is terminally forked as shown at 33 to ride in the groove of the sleeve 28. This lever may be operatively connected in any preferred manner to an operating lever within convenient reach of the driver's seat upon the automobile. It is to be understood that any suitable mechanism for shifting the cone may be employed, other than that illustrated, without departing from the spirit of the invention.

From the above description taken in connection with the accompanying drawings, it will be apparent that I have provided an extremely simple, strong and durable mechanism for locking the pinions of a differential gear against rotation whereby to lock the axle section together for simultaneous rotation when desired.

What is claimed, is:—

1. The combination with the sectional axle of an automobile, of a driven gear wheel having a hub journaled on both of said axle sections, bevel gear wheels secured on the adjacent ends of said axle sections within said hub, intermediate bevel pinions journaled on said hub and meshing with said bevel gear wheels, of a hinged plate on said hub above one pinion, a pin carried by said plate projecting through said hub and adapted to engage in an opening in the related pinion, a means for normally holding said plate at its outer limit of movement and the pin disengaged from said pinion, and means for depressing said plate against the action of the holding means to engage said pin with said pinion and lock said pinion against rotation on said hub.

2. The combination with the sectional axle of an automobile, of a driven gear wheel having a hub journaled on both of said axle sections, bevel gear wheels secured on the adjacent ends of said axle sections within said hub, intermediate bevel pinions journaled on said hub and meshing with said bevel gear wheels, of a hinged plate on the exterior of said hub above one pinion, a pin carried by said plate adapted to engage in an opening in said pinion and lock said pinion against rotation, a spring normally holding said plate at its outer limit of movement and said pin disengaged from said pinion, and a shiftable cone embracing said hub and riding upon said plate whereby to depress said plate and engage said pin with said pinion.

In testimony whereof, I affix my signature, in the presence of two witnesses.

CLARENCE G. LIBBERS.

Witnesses:
JENNIE SCHEPERS,
C. R. RATHBUN.